Figure 1:
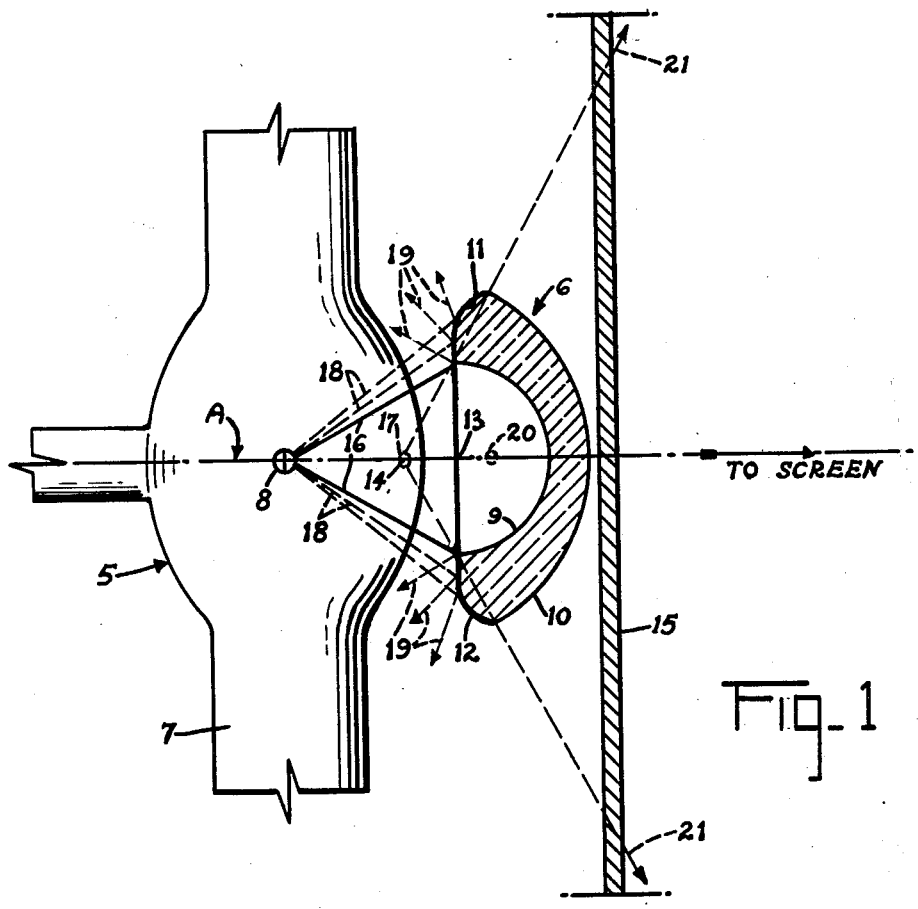

May 5, 1964   B. C. KALUSTYAN   3,131,595
DE-MAGNIFYING OPTICAL SYSTEM FOR TRANSPARENCY PROJECTION
Filed March 15, 1961

INVENTOR.
BERDJ C. KALUSTYAN
BY Laurence S. Epstein
ATTORNEYS

United States Patent Office 3,131,595
Patented May 5, 1964

3,131,595
DE-MAGNIFYING OPTICAL SYSTEM FOR TRANSPARENCY PROJECTION
Berdj C. Kalustyan, Bergenfield, N.J., assignor, by mesne assignments, to the United States of America as represented by the Secretary of the Navy
Filed Mar. 15, 1961, Ser. No. 96,054
4 Claims. (Cl. 88—24)

The invention described herein may be manufactured and used by the Government for governmental purposes without the payment of any royalty thereon.

This invention relates generally to the art of picture projection, and more particularly to the system of optics embodied in projection apparatus designed for use with color-slides, photographic film and other transparencies.

Although the present invention may be embodied in color-slide projectors generally, its conception is particularly concerned with the use thereof in a so-called point source projection system which advantageously finds application in student pilot training and/or briefing devices so as to present to the student a visual display or picture of a terrain or other object in a manner which simulates the effect of a vehicle in motion. By virtue of the point source projection system a non-programmed, wide angle, three-dimensional visual display or picture in color and with satisfactory perspective is effectively achieved. The point source projection system has application in other areas as well as where a visual display is required for a specific purpose.

Briefly, in the point source projection system, the projecting element is a point source which emits a solid cone of light flux so that a transparency positioned in the path of the light flux is projected onto a reflecting screen for viewing purposes. The transparency which depicts a specific area or terrain to a reduced scale, may be and preferably is in color, and three-dimensional objects may be mounted in relief on said transparency so that said objects are projected in proper perspective upon the viewing screen. To give the illusion of motion to the observer or student pilot, the transparency is moved relative to the light source or vice versa, for example, to give the illusion of changes in altitude, the light source and transparency are moved relatively farther apart to depict increased altitude, and are moved relatively closer together to depict decreased altitude.

To increase the angle of light output, a reflective coating to the back plane of the lens is provided. This is based on the fact that a reflective back surface of a meniscus lens will create a virtual image of the object (the actual point source) which will be very near the virtual image created through refraction by the lens. The reflected rays then appear to originate from the same point as the refracted rays. Further, by properly crowning the back plane of the meniscus lens, it is possible to join the reflected rays at the periphery of the refracted rays. The final light output from such a lens is an uninterrupted portion of a sphere exceeding 180°.

It is the main object of the present invention to provide for use particularly in a point source projection system for transparencies a novel optical system which will advantageously provide the above described point source of light in a relatively simple and inexpensive manner.

Another object of the invention is to provide for use particularly, but not exclusively, in a point source projection system for transparencies a novel optical system consisting of an absolute minimum number of component parts and which are relatively simple in construction and inexpensive to manufacture and supply.

Another object is to provide for use particularly, but not exclusively, in a point source projection system for transparencies a novel optical system including a lens which will effectively increase the angle of coverage of light rays emanating from a virtual image of a real light source.

Another object is to provide for use particularly, but not exclusively, in a point source projection system for transparencies a novel optical system including a lens which will effectively demagnify a real light source of a relatively large diameter and high photometric brightness to a virtual minute image of said light source.

Figure 2:
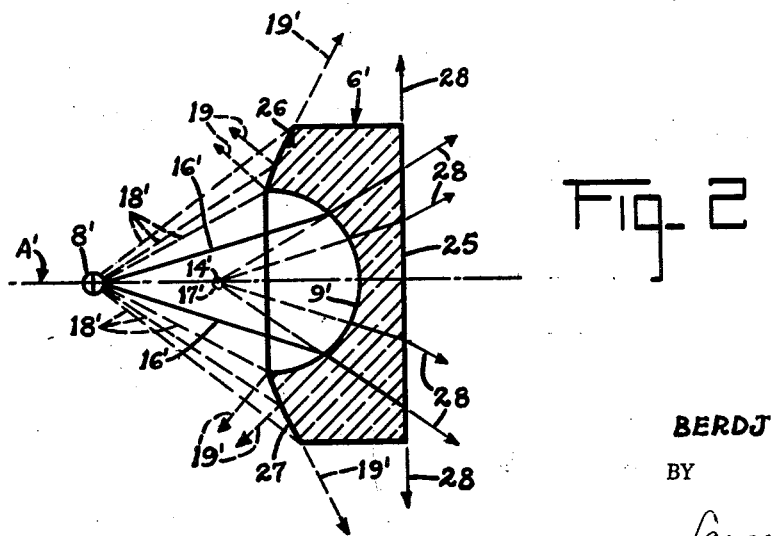

Other objects and many of the attendant advantages of this invention will be readily appreciated as the same becomes better understood by reference to the following detailed description when considered in connection with the accompanying drawings wherein:

FIG. 1 is a side elevational view, partly in section, of one form of optical system embodying the present invention; and FIG. 2 is a fragmentary side elevational view, partly in section, similar to FIG. 1 but showing a modification of the projection lens.

In the embodiment shown in FIG. 1, the novel optical system contemplated by the present invention, which is particularly, but not exclusively, adapted for use in a point source projection system for transparencies, comprises a light source indicated generally at 5, and a single lens indicated generally at 6. The light source 5 is in the form of an arc lamp 7 which is capable of producing light of a relatively high photometric brightness or luminance. The lamp 7 is positioned so that the real source of light indicated at 8 is located directly on the line of the optical axis A of the system. In the interest of clarity, the lamp 7, lens 6, light source 8, and other elements to be hereinafter described, are shown on a large and exaggerated scale in the drawing.

The arc lamps of the desired high light intensity which are commercially available for use in the present system, produce such light which is at the source thereof of a relatively large diameter. One such arc lamp which is relatively small in overall size and has been used, for example, in the present system is manufactured by Osram and is identified as Osram HBO–109. The latter lamp is capable of continuously delivering light of approximately 350–400 metered candle power and of an approximate diameter of .014–.016 inch at the source thereof.

In a point source projection sysem in particular, the projection of the transparency, as well as the luminance and definition of the projected picture or image, is wholly dependent upon a light source which is not only of a relatively high intensity, but which is at the source thereof also of a minute diameter or practically point size. The smaller the diameter of the light source, the better is the projection and the projected picture definition. The higher the brightness of the light source, the greater is the luminance of the projected picture. Accordingly, the lens 6 which is preferably located relatively close to the lamp 7 and symmetrically on opposite sides of the optical axis A, effectively and advantageously provides in a novel manner such projection light source of a minute diameter or substantially point size and of a high degree of photometric brightness. This lens 6 effectively serves to demagnify the real light source 8 to a virtual image of minute diameter of said light source and at the same time increase the luminance of said image. Additionally, by virtue of the construction of the lens 6, the angle of coverage of the transmitted light rays appears to be emanating from the virtual image and is advantageously increased.

For this purpose, the lens 6, constructed as herein shown, is a negative meniscus-shaped element of solid, clear optical glass, having a concave spherical surface 9 facing the lamp 7, and a convex spherical surface 10 facing away from said lamp. The back surface of the lens 6 is optically crowned as indicated at 11 to a predetermined radius, and this crowned surface is coated, as indicated at 12, with a suitable light reflecting material, such as silver. The center of curvature of the concave spherical surface 9 is located on the optical axis A at the point 13 which is substantially in line with the back surface of the lens 6. The center of curvature of the convex spherical surface 10 is also located on the optical axis A, but is spaced rearwardly a predetermined distance from the point 13 as indicated at 14.

In the system just described, a transparency 15 is positioned at a selected point relatively close to and forwardly of the meniscus lens 6 and such that it intersects the optical axis A and is disposed in the path of the light flux emanating from said lens. The light flux from the real light source 8 of the energized lamp 7 is received by the meniscus lens 6, and since said lens is located quite close to said lamp, the maximum light flux is collected by the lens, as indicated by the full angular lines 16. The light flux thus collected by the meniscus lens 6 is then demagnified by said lens, thereby forming a virtual image 17 of the real light source 8, which image is of a minute diameter or substantially point size, said demagnification and resulting virtual image occurring, in the illustrated embodiment, substantially at the point 14 on the optical axis A. This demagnification of the real light source 8 by the lens 6 is obtained at the expense of some reduction in intensity of light.

The light rays emanating from the real light source 8 are also collected by the silver portion 11 of the lens 6, as indicated by the broken angular lines 18, and reflected therefrom as indicated by the broken angular lines 19. These reflected rays of light 19 form a second virtual image 20 of the real light source 8, said second image being located on the optical axis A and in the vicinity of the virtual image 17, and being of a predetermined size consistent with the contour of the silvered surface 11.

The rays of light appear to be emanating from the virtual image 17 and are bent by the meniscus lens 6 so that said light rays diverge from said image and pass through said lens in the form of an extremely bright, solid cone of light of a predetermined relatively wide angular size. However, due to the presence of the reflected rays of light 19 obtained by the silvered portion 11 of the lens 6, the light rays diverging from the virtual image 17 are augmented in total angular light covered by said reflected rays, with the result that the angular size of the projected cone of light is further increased correspondingly to the size indicated by the broken angular lines 21. This cone of light of increased angular size intersects the optical axis A and passes through the adjacent transparency 15, thus effectively projecting said transparency with the desired picture definition and relatively high luminance onto a viewing screen (not shown) which is located a suitable distance forwardly of the transparency, and at the same time obtaining an extra wide angle presentation of the projected picture on said screen.

The embodiment illustrated in FIG. 2 of the drawing differs from the system above described only in the construction of the projection lens which has the reference character 6' applied thereto. As shown, this lens 6' is formed to provide at the front side thereof facing away from the light source 8' a flat or planar surface 25. The back surface of the lens 6' is optically crowned, as indicated at 26, on a predetermined radius which is larger than the radius of the crowned silver coated surface 11 of the lens 6 shown in FIG. 1. This crowned surface 26 of the lens 6' is also coated, as indicated at 27, with a suitable light reflecting material, such as silver. Except for the above described differences, the embodiment shown in FIG. 2 is otherwise the same as the embodiment shown in FIG. 1, the corresponding elements being given the same reference characters except that they are primed.

It will thus be seen that in the system of the second embodiment just described and illustrated in FIG. 2, the maximum light flux from the real light source 8' is collected by the lens 6', as indicated by the full angular lines 16', and demagnified by said lens to a virtual minute image 17' thereof substantially at the point 14' on the optical axis A'. The light rays emanating from the real light source 8' are also collected by the silver portion 27 of the lens 6', as indicated by the broken lines 18', and reflected therefrom as indicated by the broken lines 19'. The light rays diverging from the virtual image 17' and augmented by the reflected light rays pass through the lens 6' in the form of an extremely bright, solid, hemisphere of light, as indicated by the full lines 28, thus further increasing the projected area of the transparency over and above that obtained by the lens 6 shown in FIG. 1.

It should thereby be apparent that the provision of a point light source with a de-magnification lens positioned between the point light source and a transparency now makes it possible to project the transparency onto a screen and still have enough illumination to be useful. This also makes it possible to use a single de-magnification lens as the sole optical means to obtain such result. The sharper the projection on the screen, the better the simulation. Sharpness is a function of the diameter of the point source of light, the larger the diameter, the less sharp the light. It is also desirable to increase the area of light and with it the image projected thereon, onto the screen. This is accomplished, as is pointed out above, by further treating the negative lenses 6 and 6' to provide a reflecting surface such as 12 and 27. When this has been done as has been described above, in addition to the light rays such as 21 and 28 being refracted through the lenses, the light beams 19 and 19' are reflected backwards to provide a "doughnut" of light adjacent to and contiguous with outer periphery of the light provided through the refraction of the rays 21 and 28. Those reflected light beams 19 and 19' closely adjacent to the beams 21 and 28 depicted in FIGS. 1 and 2 tend to merge therewith while those reflecting back further away throw their own light beams onto the screen. This merger of light beams serves to provide a continuous illumination for the screen. It should be noted at this point, that by the use of a point light source and de-magnifying lens, as described above, it is now possible to retain the transparency constantly in focus no matter whether the distance between the transparency 15 and the lenses 6 and 6' are varied.

There is thus provided a novel optical system wherein a real source of light of a relatively large diameter is demagnified to a minute diameter or substantially point size virtual image of said light source. While the intensity of the virtual image of the real light source is decreased, the photometric brightness of the virtual image is increased, whereby said virtual image effectively serves as the projection source and enables projection of transparencies onto a viewing screen in a relatively simple and inexpensive manner. The reflected light rays obtained by the silver coating on the projection lens augments the light rays diverging from the virtual image and thus increases the angle of coverage of the total light output, while maintaining substantially the photometric brightness and the diameter of the real light source. Accordingly, good definition and excellent luminance, as well as an extra wide angle presentation of the projected picture are obtained.

Obviously many modifications and variations of the present invention are possible in the light of the above teachings. It is therefore to be understood that within the scope of the appended claims the invention may be practiced otherwise than as specifically described.

What is claimed is:

1. An optical system for use in the projection of transparencies onto a viewing screen, comprising a transparency, a relatively high intensity continuous point light source of illumination, a negative meniscus-shaped projection lens located in close proximity to said light source, said lens having a concave spherical surface facing said light source and a convex spherical surface facing away from said light source to refract the light through the transparency onto a screen, and reflecting means on the back of said lens facing said light source for collecting light rays from said light source and reflecting the same onto a screen adjacent the refracted light to increase the angle of coverage of the light rays, said point light source and lens maintaining the transparency in focus regardless of the distance from said lens.

2. An optical system for use in transparency projection apparatus, comprising a transparency, a lamp capable of producing a point light of a relatively high intensity light flux, the source of said light being located on the optical axis of said system and being of a relatively large diameter, and a negative meniscus-shaped projection lens positioned between said transparency and lamp and intersecting said optical axis and located in close proximity to said lamp to receive the light flux from said light source, said lens having a concave spherical surface facing said lamp and a convex spherical surface facing away from said lamp to refract the light rays, said lens having a rear surface other than said concave surface facing said lamp and which is optically crowned and coated with a light reflecting material, the center of curvature of said concave spherical surface being located at a predetermined position on said optical axis and the center of curvature of said convex spherical surface being located on said optical axis and spaced therealong toward said lamp a predetermined distance from said first-named center of curvature, said lens serving to demagnify said light source and thereby provide a virtual minute diameter image of said light source on said axis at a predetermined position between said lamp and said lens for projection of a transparency positioned in projecting relation to said lens onto a viewing screen, and said rear light reflecting surface on said lens serving to collect rays of light from said light source and reflect the same, whereby a virtual image of said light rays is provided on said optical axis adjacent said first-named virtual image to increase the angle of coverage of the light rays emanating from said first-named virtual image and projected by said lens, said point light and de-magnifying lens maintaining the transparency in focus regardless of its distance from said lens.

3. In a projection system for transparencies onto a screen, a relatively high intensity continuous point light source of illumination, a projection lens located in close proximity to said light source to receive the light directly therefrom, said lens having a concave spherical surface facing said light source and a planar surface facing away from said light source and disposed perpendicular to the optical axis of said system to refract light rays therethrough, and reflecting means on the back of said lens facing said light source for collecting light rays from said light source and reflecting the same to increase the total angle of coverage of the light rays on a screen.

4. An optional system for use in transparency projection apparatus, comprising a transparency, a point source of light of a relatively high intensity light flux and large diameter located on the optical axis of said system, and a projection lens intersecting said optical axis and located in close proximity to said light source to receive the light flux directly therefrom, said lens having a concave spherical surface facing said light source and a planar surface facing away from said light source and disposed perpendicular to said optical axis to refract light rays, the center of curvature of said concave spherical surface being located at a predetermined position on said optical axis, said lens having a rear surface other than said concave surface facing said light source and which is optically crowned and coated with a light reflecting material, said concave spherical surface serving to demagnify said light source and thereby provide a virtual image of minute diameter of said light source on said optical axis at a predetermined position between said lens and said light source, said planar surface serving to effect and project a solid hemisphere of light rays emanating from said virtual image through said transparency, and said rear light reflecting surface serving to collect light rays from said light source and reflect the same, whereby the area of coverage of the projected hemisphere of light is increased, said point light and de-magnifying lens maintaining the transparency in focus regardless of its distance from said lens.

References Cited in the file of this patent

UNITED STATES PATENTS

| 976,143 | Bostock | Nov. 22, 1910 |
| 2,165,305 | Ruths | July 11, 1939 |
| 2,225,485 | Rantsch | Dec. 17, 1940 |

FOREIGN PATENTS

| 5,191 | Great Britain | Dec. 31, 1904 |